US008786661B2

(12) United States Patent
Lindberg et al.

(10) Patent No.: US 8,786,661 B2
(45) Date of Patent: Jul. 22, 2014

(54) VIDEOPHONE INPUT APPARATUS (75) Inventors: Phillip Lindberg, Helsinki (FI); Damien Higgins, Helsinki (FI)

(73) Assignee: TwineLAB Oy, Espoo (FI)

( * ) Notice: Subject to any disclaimer, the term of this patent is extended or adjusted under 35 U.S.C. 154(b) by 230 days.

(21) Appl. No.: 13/406,061

(22) Filed: Feb. 27, 2012

(65) Prior Publication Data
US 2013/0222518 A1 Aug. 29, 2013

(51) Int. Cl.
*H04N 7/14* (2006.01)

(52) U.S. Cl.
USPC ..................... 348/14.02; 348/14.01

(58) Field of Classification Search
USPC ........... 348/14.02, 14.01, 14.04, 14.08, 14.09
See application file for complete search history.

(56) References Cited

U.S. PATENT DOCUMENTS

2013/0169736 A1* 7/2013 Lindblom et al. ......... 348/14.02

* cited by examiner

*Primary Examiner* — Stella Woo
(74) *Attorney, Agent, or Firm* — Ziegler IP Law Group LLC (57) ABSTRACT A videophone input apparatus has a communication interface for communicating with a system server, a peer and an A/V output apparatus; a processor; and a memory which causes the videophone apparatus to connect the videophone input apparatus via a local connection to the A/V output apparatus and via a first wireless connection to the system server. The videophone input apparatus transceives configuration information between the videophone input apparatus and the system server via the first wireless connection; establish a peer-to-peer connection between the videophone input apparatus and the peer over a second wireless connection; and trigger a videophone service over the peer-to-peer connection utilizing a service account defined by the system server. Furthermore, the videophone input apparatus provides user input data for the videophone service using the videophone input apparatus; and provide user output data, from the peer, for the videophone service using the A/V output apparatus.

12 Claims, 5 Drawing Sheets

VIDEOPHONE INPUT APPARATUS

TECHNICAL FIELD

The present application generally relates to a method, a system and an apparatus for providing a videophone service.

BRIEF DESCRIPTION OF RELATED DEVELOPMENTS

Due to recent advances of mobile telecommunications, popularity of mobile phones has been greatly increased. At the same time, the usage of fixed landline phone connections at home has been reduced. Video calls are widely used as a communication method providing people not only speech but streaming video of the other party as well. High-speed telecommunication networks enable video call activation between computers and cellular phones.

However, using computers or cellular phones for video calls has certain drawbacks. First, such devices are typically personal in a sense that they are carried with the person owning the device. Thus, receiving or making a video call to/from home always requires that there is someone at home with a capable video call device. Second, current videophones utilized by cellular phones have a limited input/output means, such as a camera and display. For example, if several persons would like get involved to the video call, arranging the persons around the cellular phone is difficult and uncomfortable. Third, current videophones utilized by computers require large devices, such as a personal computer and a monitor placed to a room of an apartment, in which the video call is to be established. Such arrangement is not acceptable in most living rooms. Furthermore, a complex registrations and device configurations may be needed until the video call is available. Even furthermore, users need to be aware of available services that they may even registrate for.

Thus, a solution is needed that is easy-to-use, low-cost and highly-functional as a shared object. Furthermore, such a videophone apparatus is needed that would provide a relatively large display for the video call without disturbing the interior decoration of the home apartment or the office.

SUMMARY

According to a first example aspect of the disclosed embodiments there is provided a videophone input apparatus comprising:
a communication interface for communicating with a system server, a peer and an A/V output apparatus;
at least one processor; and
at least one memory including computer program code;
the at least one memory and the computer program code configured to, with the at least one processor, cause the videophone apparatus to:
connect the videophone input apparatus via a local connection to the A/V output apparatus and via a first wireless connection to the system server;
transceive configuration information between the videophone input apparatus and the system server via the first wireless connection;
establish a peer-to-peer connection between the videophone input apparatus and the peer over a second wireless connection;
trigger a videophone service over the peer-to-peer connection utilizing a service account defined by the system server;
provide user input data for the videophone service using the videophone input apparatus; and
provide user output data, from the peer, for the videophone service using the A/V output apparatus.

In an embodiment, the local connection comprises at least one of the following:
a SCART cable;
a High Definition Multimedia Interface (HDMI) cable;
a RCA cable; and
a wireless local area network (WLAN) connection.

In an embodiment, the first and the second wireless connection comprise at least one of the following:
a cellular network data connection; and
a wireless local area network (WLAN) connection.

In an embodiment, the videophone input apparatus further comprising:
a microphone for producing audio data;
an audio codec for encoding the audio data to provide encoded audio data for the user input data of the videophone service;
a camera for producing video data; and
a video codec for encoding the video data to provide encoded video data for the user input data of the videophone service.

In an embodiment, the videophone input apparatus further comprising:
an audio codec for decoding encoded peer audio data of the user output data to provide audio information of the videophone service for a speaker of the A/V output apparatus; and
a video codec for decoding encoded peer video data of the user output data to provide video information of the videophone service for a display of the A/V output apparatus.

In an embodiment, the videophone input apparatus not comprising a display.

According to a second example aspect of disclosed embodiments there is provided a method comprising:
connecting a videophone input apparatus via a local connection to an A/V output apparatus and via a first wireless connection to a system server; transceiving configuration information between the videophone input apparatus and the system server via a first wireless connection;
defining a service account, by the system server, for a videophone service;
establishing a peer-to-peer connection between the videophone input apparatus and a peer over a second wireless connection;
triggering the videophone service over the peer-to-peer connection utilizing the service account;
providing user input data for the videophone service using the videophone input apparatus; and
providing user output data for the videophone service using the A/V output apparatus.

In an embodiment, the method further comprising:
encrypting the peer-to-peer connection between the videophone input apparatus and the peer over the second wireless connection.

In an embodiment, the method further comprising:
receiving audio data via a microphone of the videophone input apparatus;
encoding the audio data using an audio codec;
receiving video data via a camera of the videophone input apparatus;
encoding the video data using a video codec; and
providing the user input data for the videophone service using the encoded audio data and the encoded video data.

In an embodiment, the method further comprising:
receiving encoded user output data for the videophone service, from the peer, at the videophone input apparatus;
decoding audio data of the encoded user output data using an audio codec;

providing the audio data to a speaker of the A/V output apparatus;
decoding video data of the encoded user output data using a video codec; and
providing the video data to a display of the A/V output apparatus.

According to a third example aspect of the disclosed embodiments there is provided a computer program embodied on a computer readable medium comprising computer executable program code which, when executed by at least one processor of an apparatus, causes the apparatus to:
connect the videophone input apparatus via a local connection to an A/V output apparatus and via a first wireless connection to a system server;
transceive configuration information between the videophone input apparatus and the system server via a first wireless connection;
establish a peer-to-peer connection between the videophone input apparatus and a peer over a second wireless connection;
trigger the videophone service over the peer-to-peer connection utilizing a service account defined by the system server;
provide user input data for the videophone service using the videophone input apparatus; and
provide user output data for the videophone service using the A/V output apparatus.

According to a fourth example aspect of the disclosed embodiments there is provided
a videophone input apparatus, configured to:
connect via a local connection to an A/V output apparatus and via a first wireless connection to a system server;
trigger a videophone service over a peer-to-peer connection utilizing a service account; and
provide user input data for the videophone service;
the system server configured to:
transceive configuration information with the videophone input apparatus via the first wireless connection; and
define the service account for the videophone service;
a peer configured to:
establish the peer-to-peer connection between the videophone input apparatus over a second wireless connection; and
the A/V output apparatus configured to:
provide user output data, from the peer, for the videophone service.

Different non-binding example aspects and embodiments of the disclosure have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The aspects of the disclosed embodiments will be described, by way of example only, with reference to the accompanying drawings, in which.

DETAILED DESCRIPTION

In the following description, like numbers denote like elements.

Figure 1:
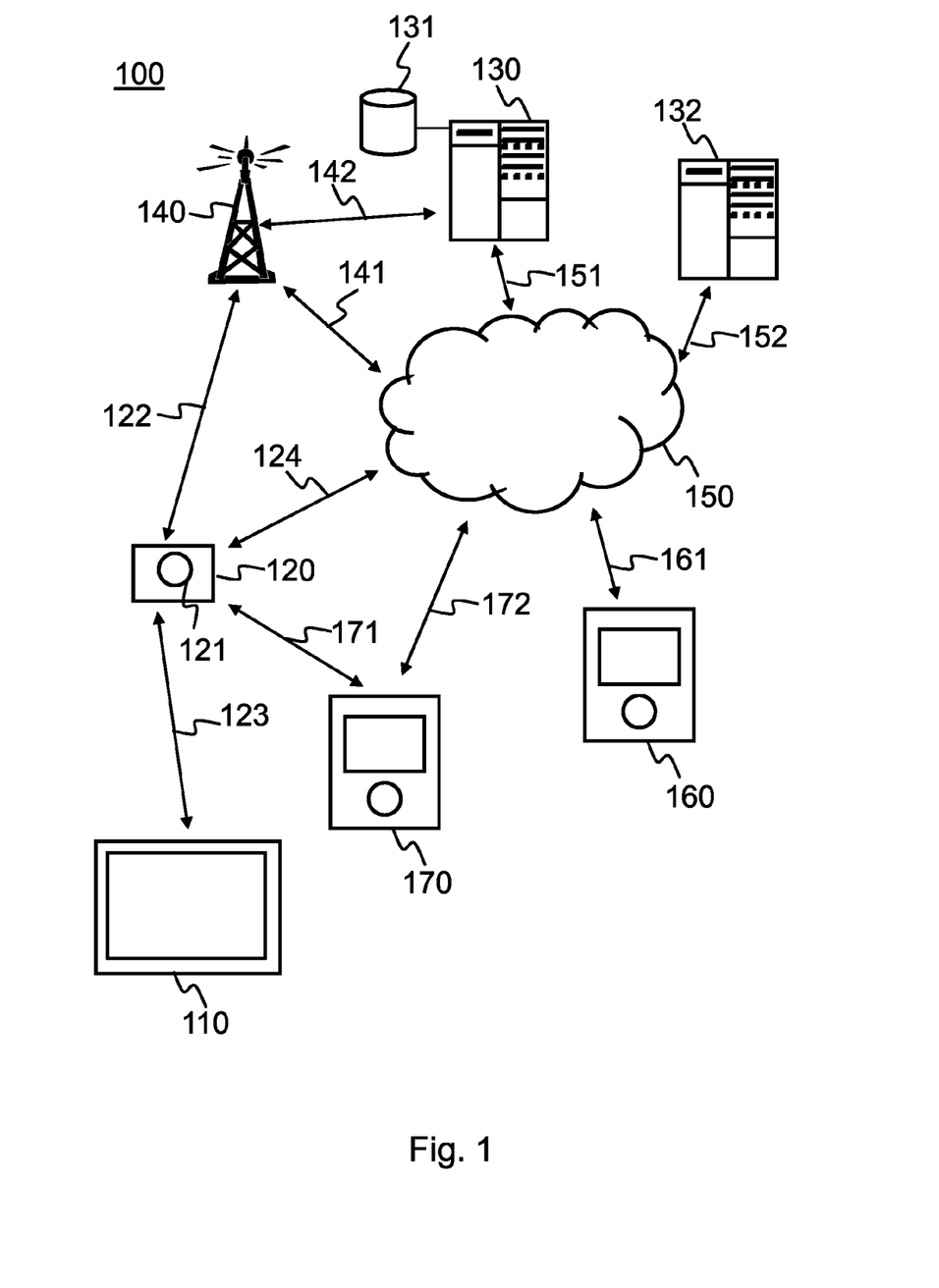
FIG. 1 shows a schematic picture of a system according to an aspect of the disclosed embodiments.

FIG. 1 shows a schematic picture of a system 100 according to an example embodiment. A user apparatus, such as a videophone input apparatus 120 may comprise a mobile terminal without a display and comprising a communication interface, for example. The videophone input apparatus 120 is capable of downloading and locally executing software program code. The software program code may be a client application of a service whose server application is running on a server apparatus 130, 132 of the system 100. The videophone input apparatus 120 may comprise a camera 121 for providing video stream for the video call and a microphone for providing audio stream for the video call, for example. In an embodiment, the videophone input apparatus may comprise a ringer or a notification speaker 290. The videophone input apparatus 120 is configured to be connectable to a wireless communication network 140 over a wireless connection 122. The wireless connection 122 may comprise a mobile cellular network or a wireless local area network (WLAN), for example. The wireless communication network may be to a public data communication network 150, for example the Internet, over a data connection 141. The videophone input apparatus 120 is configured to be connectable to the public data communication network 150, for example the Internet, directly over a data connection 124 that may comprise a fixed broadband access.

In an embodiment, the system 100 comprises an A/V output apparatus 110 configured to be connectable to the videophone input apparatus 120 over a local connection 123. The local connection 123 may comprise a wired connection or a wireless connection. The wired connection may comprise Universal Serial Bus (USB), High-Definition Multimedia Interface (HDMI), SCART interface or RCA interface, for example. The wireless connection may comprise Bluetooth™, Radio Frequency Identification (RF-ID) or wireless local area network (WLAN), for example. Near field communication (NFC) may be used for device identification between the A/V output apparatus 110 and the videophone input apparatus 120, for example. The A/V output apparatus 110 may comprise a television, for example.

In an embodiment, the system 100 comprises a server apparatus 130, which comprises a storage device 131 for storing service data, service metrics and subscriber information, over data connection 151. The service data may comprise configuration data, account creation data, peer-to-peer service data over cellular network and peer-to-peer service data over wireless local area network (WLAN), for example. The service metrics may comprise operator information for use in both user identification and preventing service abuse, as the device 120 and the user account are locked to a subscriber of an operator network using the subscriber identity module (SIM) of the device 120 and the service account details.

In an embodiment, service data may travel over different paths. A first path may comprise sending configuration information over a wireless communication network 122, 140, 142 from the server apparatus 130. A second path may comprise sending account creation data between the server apparatus 130 and a peer-to-peer service apparatus 160 over the data connection 150, 151, 161, for example.

In an embodiment, a proprietary application in the videophone input apparatus 120 may be a client application of a service whose server application is running on the server apparatus 130 of the system 100 and whose peer-to-peer client application is running on the peer-to-peer service apparatus 160. The proprietary application may capture the user input data for the videophone service and provide the user output data, from the peer, for the videophone service using the A/V output apparatus 110 over the local connection 123. In an embodiment, configuration information between the videophone input apparatus 120 and the system server 130 is transceived via the first wireless connection 122, 140, 142 automatically and configured by the server apparatus 130. Thus the user of the videophone input apparatus 120 may not need to do any initialization or configuration for the service. The system server 130 may also take care of account creation process for the service, such as videophone service between the videophone input apparatus 120 and the peer 160.

In an embodiment, the system 100 comprises a service server apparatus 132, for storing service data, service metrics and subscriber information, over data connection 152. The service data may comprise service account data, peer-to-peer service data and service software, for example.

In an embodiment, a proprietary application in the videophone input apparatus 120 may be a client application of a service whose server application is running on the server apparatus 132 of the system 100 and whose peer-to-peer client application is running on the peer-to-peer service apparatus 160. The proprietary application may capture the user input data for the videophone service and provide the user output data, from the peer, for the videophone service of the service server 132 using the A/V output apparatus 110 over the local connection 123. In an embodiment, configuration information between the videophone input apparatus 120 and the system server 130 is transceived via the first wireless connection 122, 140, 142 automatically and configured by the system server apparatus 130. Furthermore, the system server apparatus 130 may automatically create a service account in the service server 132, for the videophone input apparatus 120. Thus the user of the videophone input apparatus 120 may not need to do any initialization or configuration for the service. Thus, the system server 130 may take care of account creation process for the service, such as videophone service between the videophone input apparatus 120 and the peer 160.

In an embodiment, a videophone call may be established as a peer-to-peer connection between the videophone input apparatus 120 and the peer 160 over a second wireless connection 122, 140, 141 to the public data communication network 150, 161 and to the peer 160. The second wireless connection 122, 140, 141 may comprise for example a wireless local area network connection.

In an embodiment, a videophone call may be established as a peer-to-peer connection between the videophone input apparatus 120 and the peer 160 over a second wireless connection 122, 140, 142 to the public data communication network 150, 161 and to the peer 160. The second wireless connection 122, 140, 142 may comprise for example a cellular network connection provided by an operator of the system server 130.

In an embodiment, a videophone call may be established as a peer-to-peer connection between the videophone input apparatus 120 and the peer 160 over a data connection 124 to the public data communication network 150, 161 and to the peer 160. The data connection 124 may comprise for example a wired local area network connection.

In an embodiment, the videophone input apparatus 120 may be connected over a local connection 171 to a mobile apparatus 170, such as a mobile phone. The local connection may be a wireless connection and comprise Infrared, Bluetooth™, Radio Frequency Identification (RF-ID), wireless local area network (WLAN) or near field communication (NFC), for example. The mobile apparatus 170 may comprise, for example, a mobile phone, a tablet, a laptop or a remote controller. The mobile apparatus 170 may be used for remotely controlling the videophone input apparatus 120.

In an embodiment, the videophone input apparatus 120 may be connected over a local data connection 124 to a network 150, such as Internet, and furthermore over a data connection 172 to the mobile apparatus 170 and over a data connection 151 to a system server apparatus 130, 131. The local connection may be a wireless connection and comprise Infrared, Bluetooth™ Radio Frequency Identification (RF-ID), wireless local area network (WLAN) or near field communication (NFC), for example. The mobile apparatus 170 may comprise, for example, a mobile phone, a tablet or a laptop. The mobile apparatus 170 may be used for remotely controlling the videophone input apparatus 120. The videophone input apparatus 120 may be used primarily for consumption of media, whilst any configuration tasks (e.g. text entry for adding a friend to a contacts list) are performed elsewhere using existing tools with an appropriate affordance. In an embodiment, a web application utilizing the mobile apparatus 170 and a browser of the mobile apparatus 170 may be used to configure the videophone input apparatus 120. The mobile apparatus 170 may be authenticated and configuration data sent from the mobile apparatus 170 to the system server 130, 131 wherein configuration settings for the videophone input apparatus 120 is modified based on the received data. In an embodiment, the modified settings may then be sent to the videophone input apparatus 120 over the network 150 and the local connection 124 or the wireless operator 141, 140, 122. For example, a SMS-based configuration message may be used to convey the configuration data.

In an embodiment, other services and service providers than videophone service may be used. In such cases, service account creation process may be automatic for third party services as well. The service account created (e.g. for the videophone service) to the system server 130, 131 may be used to create further accounts for each service the user may choose. Such account creation may be done machine-to-machine between the system server 130, 131 and any third party, such as the service server 132. Thus, the system server 130, 131 may host all account credentials on behalf of the user or the group of users (e.g. a family or associated group of professionals in an office).

In an embodiment, configuration information between the videophone input apparatus and the system server may be transceived via the first wireless connection and a peer-to-peer connection may be established between the videophone input apparatus and the peer over a second wireless connection. The first connection for configuration information may be transmitted over cellular data connection (e.g. 3G or 4G) and the second connection for peer-to-peer content may be transmitted over non-cellular data connection (e.g. wireless LAN). However, the first or the second connection may be used for both purposes.

In an embodiment, the videophone input apparatus 120 may comprise an A/V input apparatus.

Figure 2:
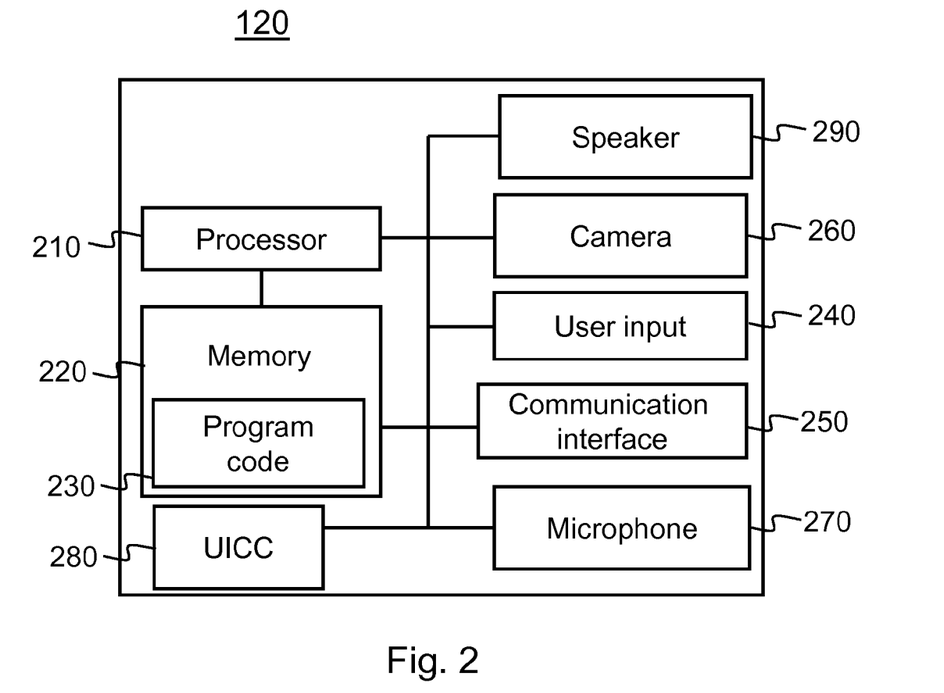
FIG. 2 presents an example block diagram of a videophone input apparatus.

FIG. 2 presents an example block diagram of a videophone input apparatus 120 in which various aspects of the disclosed embodiments may be applied. The videophone input apparatus 120 may be a user equipment (UE), user device or apparatus, such as a mobile terminal, or other communication device comprising a communication interface, a camera and a microphone.

The general structure of the videophone input apparatus 120 comprises a user input device 240, a communication interface 250, a microphone 270, a camera 260, a processor 210, and a memory 220 coupled to the processor 210. The videophone input apparatus 120 further comprises software 230 stored in the memory 220 and operable to be loaded into and executed in the processor 210. The software 230 may comprise one or more software modules and can be in the form of a computer program product. The videophone input apparatus 120 may further comprise a universal integrated circuit card (UICC) 280.

The processor 210 may be, e.g., a central processing unit (CPU), a microprocessor, a digital signal processor (DSP), a graphics processing unit, or the like. FIG. 2 shows one processor 210, but the videophone input apparatus 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The videophone input apparatus 120 may comprise a plurality of memories. The memory 220 may be constructed as a part of the videophone input apparatus 120 or it may be inserted into a slot, port, or the like of the videophone input apparatus 120 by a user. The memory 220 may serve the sole purpose of storing data, or it may be constructed as a part of an apparatus serving other purposes, such as processing data.

The user input device 240 may comprise circuitry for receiving input from a user of the videophone input apparatus 120, e.g., via a keyboard, a touch-screen of the videophone input apparatus 120, speech recognition circuitry, gesture recognition circuitry or an accessory device, such as a headset or a remote controller, for example.

The camera 260 may be a still image camera or a video stream camera, capable for creating multimedia data for videophone service.

The speaker 290 is configured to notify a user of an incoming call and to provide other user alarm sounds. Such speaker is advantageous especially in case the A/V output apparatus 110 (e.g. TV) is in off/standby mode. The speaker 290 also allows the user to answer the incoming call and hear the caller before turning the A/V output apparatus 110 (e.g. TV) on. Thus, the user may start the conversation while searching for a remote control of the A/V output apparatus 110 (e.g. TV), for example.

The microphone 270 is configured to capture user speech information for the video call service.

In an embodiment, the microphone 270 may be used to disable the speaker 290 when identical audio output is detected, using the microphone 270, from an external source, such as the A/V output apparatus 110. The device speaker 290 may only be required when the A/V output apparatus 110 (e.g. TV) is switched off or operating at very low volumes. The additional audio output from the A/V output apparatus 110 (e.g. TV) is at a variable distance from the microphone 270 (measured in time), compared to the on-board speaker 290 (internal source) which is at a fixed/known distance from the microphone 270. The identical audio output may be detected based on audio data comparison and based on distance calculation the audio data source may be determined to be the A/V output apparatus 110 (e.g. TV) and the speaker 290 may be switched off automatically. The universal integrated circuit card (UICC) 280 is the smart card used in mobile terminals in GSM and UMTS networks. The UICC 280 ensures the integrity and security of all kinds of personal data, and it typically holds a few hundred kilobytes. In a GSM network, the UICC 280 contains a SIM application and in a UMTS network the UICC 280 contains a USIM application. The UICC 280 may contain several applications, making it possible for the same smart card to give access to both GSM and UMTS networks, and also provide storage of a phone book and other applications. It is also possible to access a GSM network using a USIM application and it is possible to access UMTS networks using a SIM application with mobile terminals prepared for this.

The communication interface module 250 implements at least part of data transmission. The communication interface module 250 may comprise, e.g., a wireless or a wired interface module. The wireless interface may comprise such as a WLAN, Bluetooth, infrared (IR), radio frequency identification (RF ID), NFC, GSM/GPRS, CDMA, WCDMA, or LTE (Long Term Evolution) radio module. The wired interface may comprise such as universal serial bus (USB), HDMI, SCART or RCA, for example. The communication interface module 250 may be integrated into the videophone input apparatus 120, or into an adapter, card or the like that may be inserted into a suitable slot or port of the videophone input apparatus 120. The communication interface module 250 may support one radio interface technology or a plurality of technologies. The communication interface module 250 may support one wired interface technology or a plurality of technologies. The videophone input apparatus 120 may comprise a plurality of communication interface modules 250.

A skilled person appreciates that in addition to the elements shown in FIG. 2, the videophone input apparatus 120 may comprise other elements, such as additional microphones, extra speakers, extra cameras, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the videophone input apparatus 120 may comprise a disposable or rechargeable battery (not shown) for powering when external power if external power supply is not available.

In an embodiment, the videophone input apparatus 120 comprises speech or gesture recognition means. Using these means, a pre-defined phrase or a gesture may be recognized from the speech or the gesture and translated into control information for the apparatus 120, for example.

Figure 3:
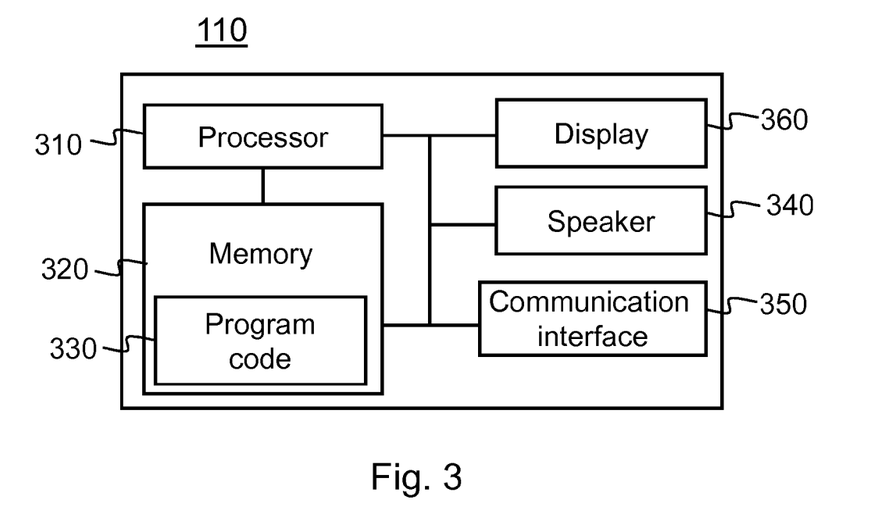
FIG. 3 presents an example block diagram of an A/V output apparatus.

FIG. 3 presents an example block diagram of an A/V output apparatus 110 in which various aspects of the disclosed embodiments may be applied. The A/V output apparatus 110 may be a television comprising a communication interface, a display and a speaker.

The general structure of the A/V output apparatus 110 comprises a communication interface 350, a display 360, a processor 310, and a memory 320 coupled to the processor 310. The A/V output apparatus 110 further comprises software 330 stored in the memory 320 and operable to be loaded into and executed in the processor 310. The software 330 may comprise one or more software modules and can be in the form of a computer program product.

The processor 310 may be, e.g., a central processing unit (CPU), a microprocessor, a digital signal processor (DSP), a graphics processing unit, or the like. FIG. 3 shows one processor 310, but the A/V output apparatus 110 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The A/V output apparatus 110 may comprise a plurality of memories. The memory 320 may be constructed as a part of the A/V output apparatus 110 or it may be inserted into a slot, port, or the like of the A/V output apparatus 110 by a user. The memory 320 may serve the sole purpose of storing data, or it may be constructed as a part of an apparatus serving other purposes, such as processing data.

The speaker 340 may comprise a loudspeaker or multiple loudspeakers. Furthermore, the speaker 340 may comprise a jack for headphones and the headphones.

The display 360 may comprise a LED screen, a LCD screen or a plasma screen, for example.

The communication interface module 350 implements at least part of data transmission. The communication interface module 350 may comprise, e.g., a wireless or a wired interface module. The wireless interface may comprise such as a WLAN, Bluetooth, infrared (IR) or radio frequency identification (RF ID) radio module. The wired interface may comprise such as universal serial bus (USB), HDMI, SCART or RCA, for example. The communication interface module 350 may be integrated into the A/V output apparatus 110, or into an adapter, card or the like that may be inserted into a suitable slot or port of the A/V output apparatus 110. The communication interface module 350 may support one radio interface technology or a plurality of technologies. The communication interface module 350 may support one wired interface technology or a plurality of technologies. The A/V output apparatus 110 may comprise a plurality of communication interface modules 350.

A skilled person appreciates that in addition to the elements shown in FIG. 3, the A/V output apparatus 110 may comprise other elements, such as microphones, speakers, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the A/V output apparatus 110 may comprise a disposable or rechargeable battery (not shown) for powering when external power if external power supply is not available.

Figure 4:
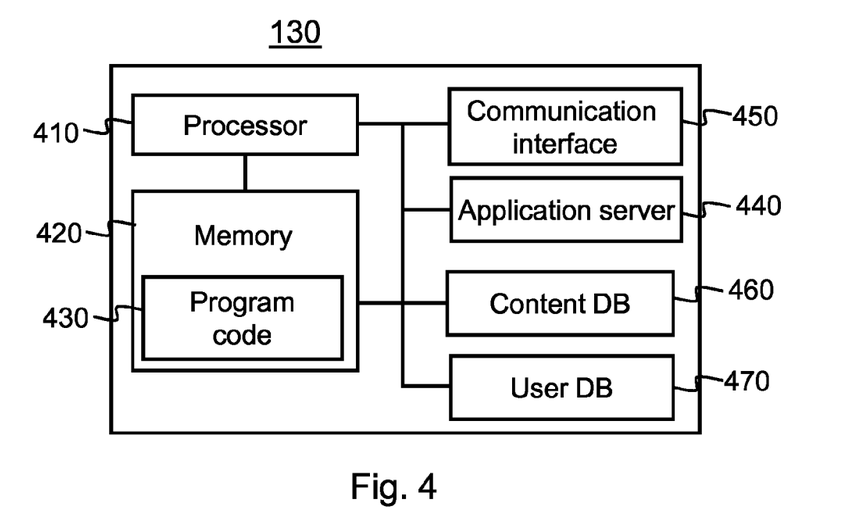
FIG. 4 presents an example block diagram of a server apparatus.

FIG. 4 presents an example block diagram of a server apparatus 130 in which various aspects of the disclosed embodiments may be applied.

The general structure of the server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 420 may be constructed as a part of the server apparatus 130 or it may be inserted into a slot, port, or the like of the server apparatus 130 by a user. The memory 420 may serve the sole purpose of storing data, or it may be constructed as a part of an apparatus serving other purposes, such as processing data.

The communication interface module 450 implements at least part of data transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as Ethernet or universal serial bus (USB), for example. The communication interface module 450 may be integrated into the server apparatus 130, or into an adapter, card or the like that may be inserted into a suitable slot or port of the server apparatus 130. The communication interface module 450 may support one radio interface technology or a plurality of technologies. Configuration information between the videophone input apparatus 120 and the system server 130 may be transceived using the communication interface 450. Similarly, account creation information between the system server 130 and a service provider may be transceived using the communication interface 450.

An application server 440 provides application services e.g. relating to the user accounts stored in a user database 470 and to the service information stored in a service database 460. The service information may comprise content information, content management information or metrics information, for example.

A skilled person appreciates that in addition to the elements shown in FIG. 4, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 5:
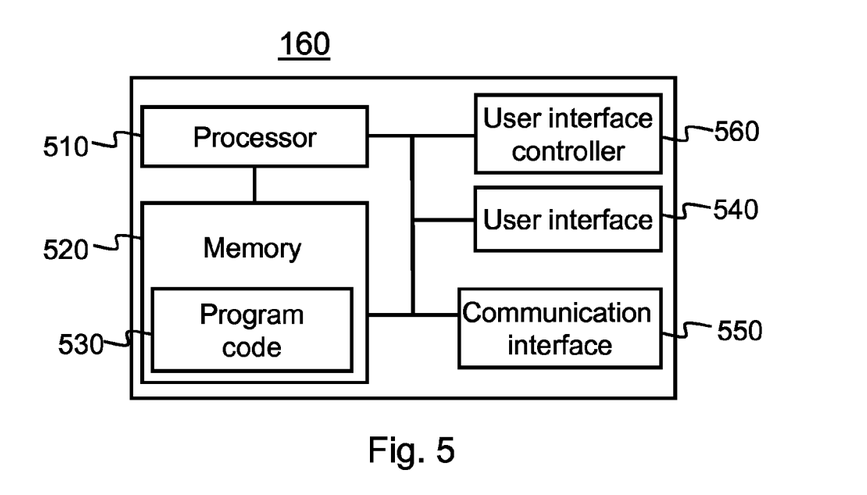
FIG. 5 presents an example block diagram of a peer apparatus.

FIG. 5 presents an example block diagram of a peer apparatus 160 in which various aspects of the disclosed embodiments may be applied. The peer apparatus 160 may be a user equipment (UE), user device or apparatus, such as a mobile terminal, a smart phone, a laptop computer, a desktop computer or other communication device.

The general structure of the peer apparatus 160 comprises a user interface 540, a communication interface 550, a processor 510, and a memory 520 coupled to the processor 510. The peer apparatus 160 further comprises software 530 stored in the memory 520 and operable to be loaded into and executed in the processor 510. The software 530 may comprise one or more software modules and can be in the form of a computer program product. The peer apparatus 160 may further comprise a user interface controller 560.

In an embodiment, the peer apparatus 160 may be remotely controlled by an external apparatus in a similar way as described before in this description between the videophone input apparatus 120 and the mobile apparatus 170.

The processor 510 may be, e.g., a central processing unit (CPU), a microprocessor, a digital signal processor (DSP), a graphics processing unit, or the like. FIG. 5 shows one processor 510, but the computer apparatus 160 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The peer apparatus 160 may comprise a plurality of memories. The memory 520 may be constructed as a part of the peer apparatus 160 or it may be inserted into a slot, port, or the like of the peer apparatus 160 by a peer user. The memory 520 may serve the sole purpose of storing data, or it may be constructed as a part of an apparatus serving other purposes, such as processing data.

The user interface controller 560 may comprise circuitry for receiving input from a user of the peer apparatus 160, e.g., via a keyboard, graphical user interface shown on the display of the user interfaces 540 of the peer apparatus 160, speech recognition circuitry, or an accessory device, such as a headset, and for providing output to the peer user via, e.g., a graphical user interface or a loudspeaker.

The communication interface module 550 implements at least part of radio transmission. The communication interface module 550 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB) or Ethernet, for example. The communication interface module 550 may be integrated into the peer apparatus 160, or into an adapter, card or the like that may be inserted into a suitable slot or port of the computer apparatus 160. The communication interface module 550 may support one radio interface technology or a plurality of technologies. The peer apparatus 160 may comprise a plurality of communication interface modules 550.

A skilled person appreciates that in addition to the elements shown in FIG. 5, the peer apparatus 160 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the peer apparatus 160 may comprise a disposable or rechargeable battery (not shown) for powering when external power if external power supply is not available.

Figure 6:
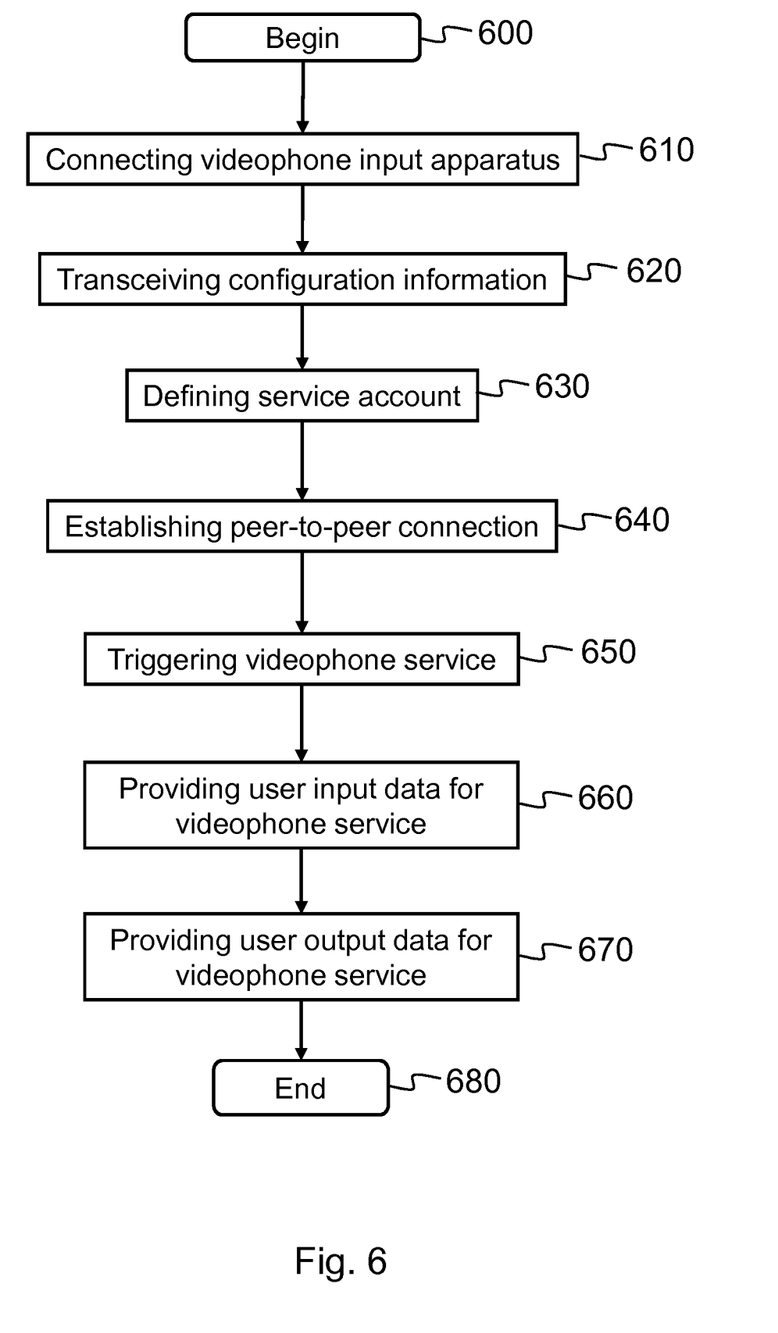
FIG. 6 shows a flow diagram showing operations in accordance with an aspect of the disclosed embodiments.

FIG. 6 shows a flow diagram showing operations in accordance with an example embodiment. In step 600, the method is started. In step 610, a videophone input apparatus is connected via a local connection to an A/V output apparatus and via a first wireless connection to a system server. Configuration information is transceived between the videophone input apparatus and the system server via a first wireless connection in step 620. In step 630, a service account is defined, by the system server, for a videophone service. In step 640, a peer-to-peer connection is established between the videophone input apparatus and a peer over a second wireless connection. The videophone service is triggered over the peer-to-peer connection utilizing the service account in step 650. In step 660, user input data is provided for the videophone service using the videophone input apparatus. In step 670, user output data is provided for the videophone service using the A/V output apparatus. The method is ended in step 680.

Figure 7:
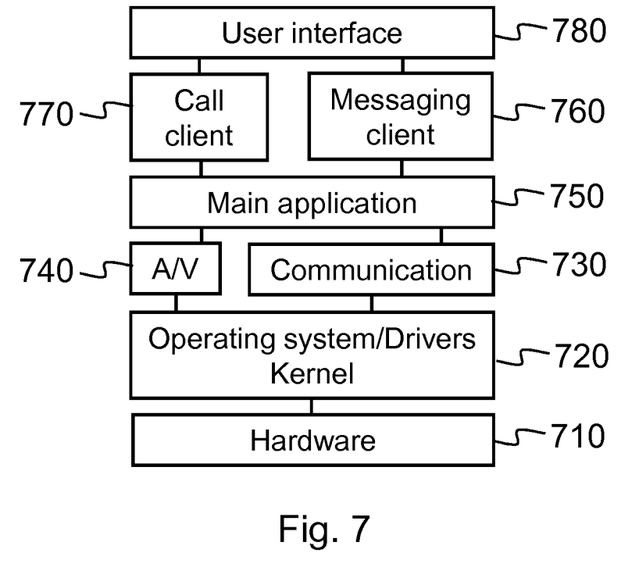
FIG. 7 shows a schematic picture of a stack relating to a videophone input apparatus.

FIG. 7 shows a schematic picture of a stack relating to a videophone input apparatus 120 according to an example embodiment.

Hardware 710 comprises all hardware components of the videophone input apparatus 120, such as processor, memory, camera and RF, for example. Next level 720 of the stack comprises operating system, drivers and kernel. With the aid of the firmware and device drivers, the kernel provides the most basic level of control over all of the hardware of the apparatus. The kernel may manage memory access for programs in the RAM, determine which programs get access to which hardware resources, set up or reset the CPU's operating states for optimal operation at all times, and organize the data for long-term non-volatile storage with file systems on such media as disks, tapes, flash memory, etc.

The operating system provides an interface between an application program 750 and the hardware 710, so that the application program 750 can interact with the hardware 710 only by obeying rules and procedures programmed into the operating system 720. The operating system is also a set of services which simplify development and execution of application programs. Executing an application program involves the creation of a process by the operating system kernel which assigns memory space and other resources, establishes a priority for the process in multi-tasking systems, loads program binary code into memory, and initiates execution of the application program which then interacts with the user and with hardware devices.

An audio/video (A/V) level 740 of the stack provides communication functionalities for the audio and video data between the videophone input apparatus 120 and the A/V output apparatus 110, such as a television, for example.

A communication level 730 of the stack provides communication functionalities for the wireless communications between the videophone input apparatus 120 and the server apparatus 130, for example.

A main application level 750 comprises the main application layer of the apparatus 120. On top of the application layer 750, plurality of clients may exist. A call client 770 may comprise a videophone call client, for example, such as a Skype client. Furthermore, a messaging client 760 may provide messaging services, such as Google Talk, video-on-demand (e.g. Netflix or Voddler), virtual DVR services or audio services (e.g. Spotify), for example. Any IP-based audio/visual content may be delivered by the videophone input apparatus 120. On top of the stack, a user interface level 780 is provided. The user interface level 780 is configured to provide the format, content and outlook of the information to a user of the apparatus 120.

Figure 8:
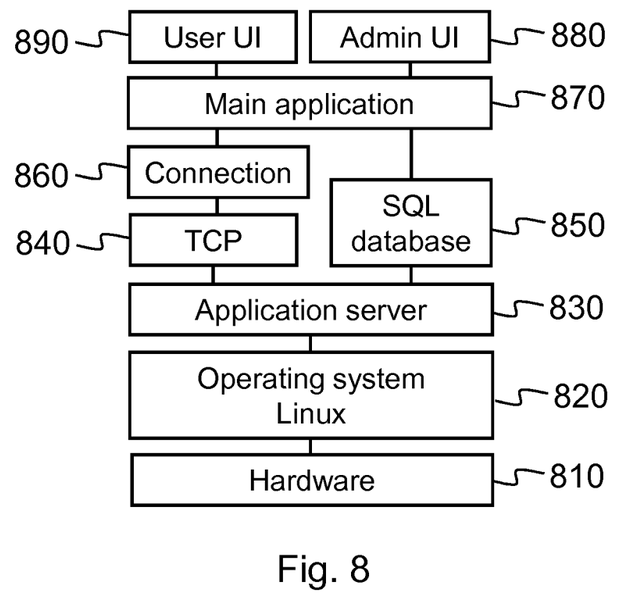
FIG. 8 shows a schematic picture of a stack relating to a server apparatus.

FIG. 8 shows a schematic picture of a stack relating to a server apparatus 130 according to an example embodiment.

Hardware 810 comprises all hardware components of the server apparatus 130, such as processor and memory, for example.

Next level 820 of the stack comprises operating system, implemented by Linux, for example. The operating system 820 provides an interface between an application server 820, a main application 870 and the hardware 810, configuring interaction with the hardware 810 only by obeying rules and procedures programmed into the operating system 820. The operating system 820 is also a set of services which simplify development and execution of application programs. Executing an application program involves the creation of a process by the operating system which assigns memory space and other resources, establishes a priority for the process in multi-tasking systems, loads program binary code into memory, and initiates execution of the application program which then interacts with the main application, users and hardware devices 810.

An application server 830 provides runtime environment for server-side components (such as Java servlets and Java server pages). The application server 830 may contain the further architectural components, such as web container, name server and security server, for example. The web container runs within the application server 830 and handles requests for servlets, Java server page files, and the web applications that contain them. The security server may provide security infrastructure and mechanisms to protect sensitive application resources and administrative resources and to address enterprise end-to-end security requirements on authentication, on resource access control, on data integrity, confidentiality, and privacy, and on secure interoperability.

A transmission control protocol (TCP) layer 840 of the server stack enables that the server apparatus 130 may serve several clients 120, 160 concurrently, by creating a child process for each client and establishing a TCP connection between the child process and the client. Unique TCP sockets are created for each connection 860. The connections 860 are in established state, when a socket-to-socket virtual connection (TCP session), is established with the remote socket, providing a duplex byte stream. The server apparatus 130 may create several concurrently established TCP sockets with the same local port number and local internet protocol (IP) address, each mapped to its own server-child process, serving its own client process. They are treated as different sockets by the operating system 820, since the remote socket address (the client IP address and/or port number) are different.

A structured query language (SQL) database level 850 of the stack provides communication functionalities for the server apparatus 130 between the server apparatus 130 and the database 131, 460, 470, for example.

A main application level 870 comprises the main application layer of the server apparatus 130. The server main application 870 may be correspond to the client side main application 750 described in FIG. 7. On top of the application layer 870, plurality of user interface layers may exist. The client user interface level 890 is configured to provide the format, content and outlook of the information to a user of the apparatus 120. The administrator user interface level 880 is configured to provide the format, content and outlook of the information to the administrator of the server 130 and the system 100.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the disclosed embodiments are set out in the independent claims, other aspects comprise other combinations of features from the described embodiments and/or the dependent claims with the features of the independent claims, and not solely the combinations explicitly set out in the claims.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A videophone input apparatus comprising:
a communication interface for communicating with a system server, a peer and an A/V output apparatus;
at least one processor; and
at least one memory including computer program code;
the at least one memory and the computer program code configured to, with the at least one processor, cause the videophone apparatus to:
connect the videophone input apparatus via a local connection to the A/V output apparatus and via a first wireless connection to the system server;
transceive configuration information automatically between the videophone input apparatus and the system server via the first wireless connection;
establish a peer-to-peer connection between the videophone input apparatus and the peer over a second wireless connection;
trigger a videophone service over the peer-to-peer connection utilizing a service account created by the system server in response to the automatically transceived configuration information between the videophone input apparatus and the system server;
provide user input data for the videophone service using the videophone input apparatus; and
provide user output data, from the peer, for the videophone service using the A/V output apparatus.

2. The videophone input apparatus of claim 1, wherein the local connection comprises at least one of the following:
a SCART cable;
a HDMI cable;
a RCA cable; and
a wireless local area network (WLAN) connection.

3. The videophone input apparatus of claim 1, wherein the first and the second wireless connection comprise at least one of the following:
a cellular network data connection; and
a wireless local area network (WLAN) connection.

4. The videophone input apparatus of claim 1, further comprising:
a microphone for producing audio data;
an audio codec for encoding the audio data to provide encoded audio data for the user input data of the videophone service;
a camera for producing video data; and
a video codec for encoding the video data to provide encoded video data for the user input data of the videophone service.

5. The videophone input apparatus of claim 1, further comprising:
an audio codec for decoding encoded peer audio data of the user output data to provide audio information of the videophone service for a speaker of the A/V output apparatus; and
a video codec for decoding encoded peer video data of the user output data to provide video information of the videophone service for a display of the A/V output apparatus.

6. The videophone input apparatus of claim 1, wherein the videophone input apparatus not comprising a display.

7. A method comprising:
connecting a videophone input apparatus via a local connection to an A/V output apparatus and via a first wireless connection to a system server;
transceiving configuration information automatically between the videophone input apparatus and the system server via a first wireless connection;
creating a service account, by the system server, for a videophone service in response to the automatically transceived configuration information between the videophone input apparatus and the system server;
establishing a peer-to-peer connection between the videophone input apparatus and a peer over a second wireless connection;
triggering the videophone service over the peer-to-peer connection utilizing the service account;
providing user input data for the videophone service using the videophone input apparatus; and
providing user output data for the videophone service using the A/V output apparatus.

8. The method of claim 7, further comprising:
encrypting the peer-to-peer connection between the videophone input apparatus and the peer over the second wireless connection.

9. The method of claim 7, further comprising:
receiving audio data via a microphone of the videophone input apparatus;
encoding the audio data using an audio codec;
receiving video data via a camera of the videophone input apparatus;
encoding the video data using a video codec; and
providing the user input data for the videophone service using the encoded audio data and the encoded video data.

10. The method of claim 7, further comprising:
receiving encoded user output data for the videophone service from the peer at the videophone input apparatus;
decoding audio data of the encoded user output data using an audio codec;
providing the audio data to a speaker of the A/V output apparatus;
decoding video data of the encoded user output data using a video codec; and
providing the video data to a display of the A/V output apparatus.

11. A computer program embodied on a non-transitory computer readable medium comprising computer executable program code, which when executed by at least one processor of a videophone input apparatus, causes the videophone input apparatus to:
connect the videophone input apparatus via a local connection to an A/V output apparatus and via a first wireless connection to a system server;
transceive configuration information automatically between the videophone input apparatus and the system server via a first wireless connection;
establish a peer-to-peer connection between the videophone input apparatus and a peer over a second wireless connection;
trigger the videophone service over the peer-to-peer connection utilizing a service account created by the system server in response to the automatically transceived configuration information between the videophone input apparatus and the system server;
provide user input data for the videophone service using the videophone input apparatus; and
provide user output data for the videophone service using the A/V output apparatus.

12. A system comprising:
a videophone input apparatus, configured to:
connect via a local connection to an A/V output apparatus and via a first wireless connection to a system server;
trigger a videophone service over a peer-to-peer connection utilizing a service account; and
provide user input data for the videophone service;
the system server configured to:
transceive configuration information automatically with the videophone input apparatus via the first wireless connection; and
create the service account for the videophone service;
a peer configured to:
establish the peer-to-peer connection between the videophone input apparatus over a second wireless connection; and
the A/V output apparatus configured to:
provide user output data, from the peer, for the videophone service.

* * * * *